Feb. 28, 1939.  M. A. POWERS  2,149,182
LIQUID FUEL BURNING APPARATUS
Original Filed April 1, 1936   2 Sheets-Sheet 1
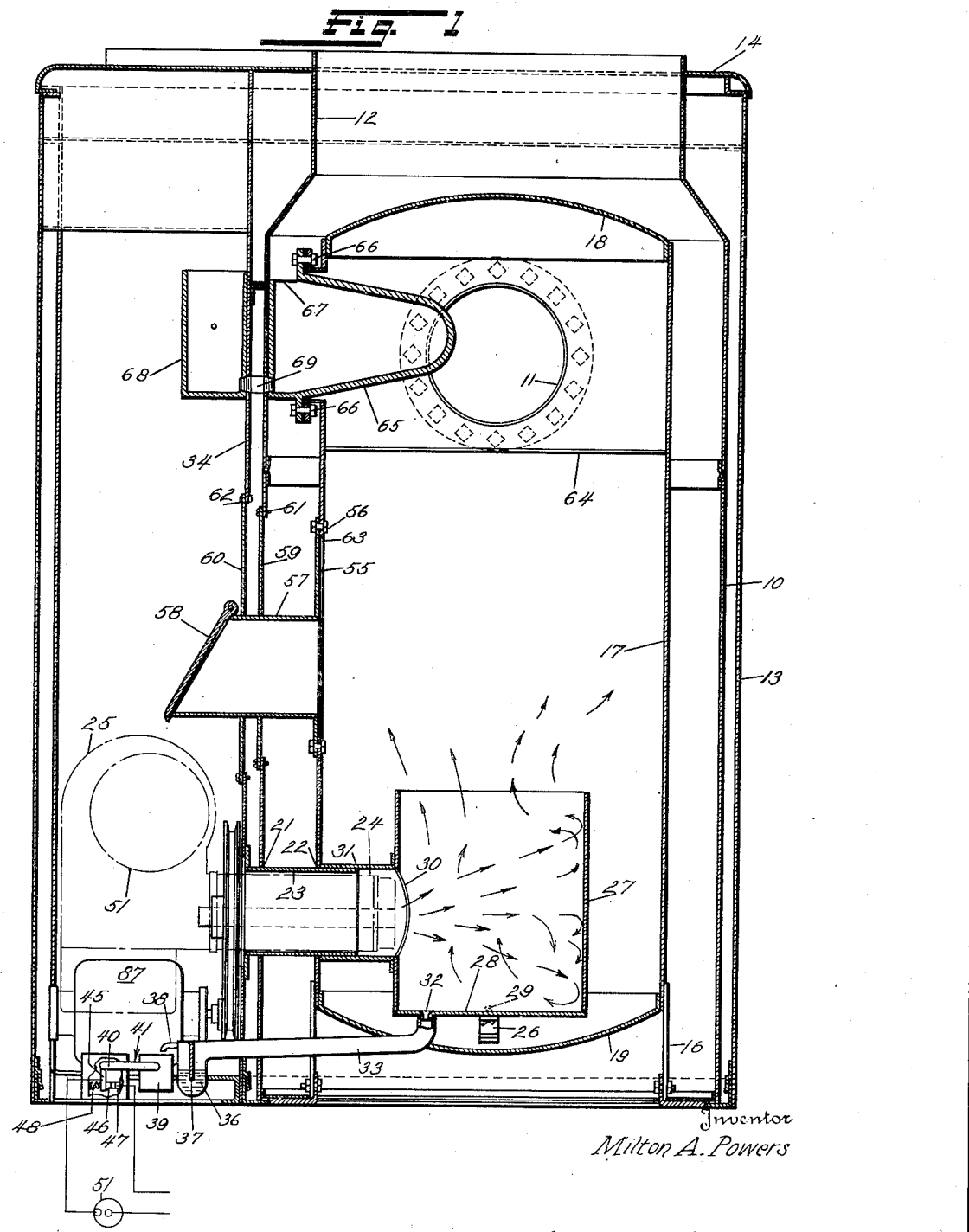
Inventor
Milton A. Powers
By Strauch & Hoffman
Attorneys

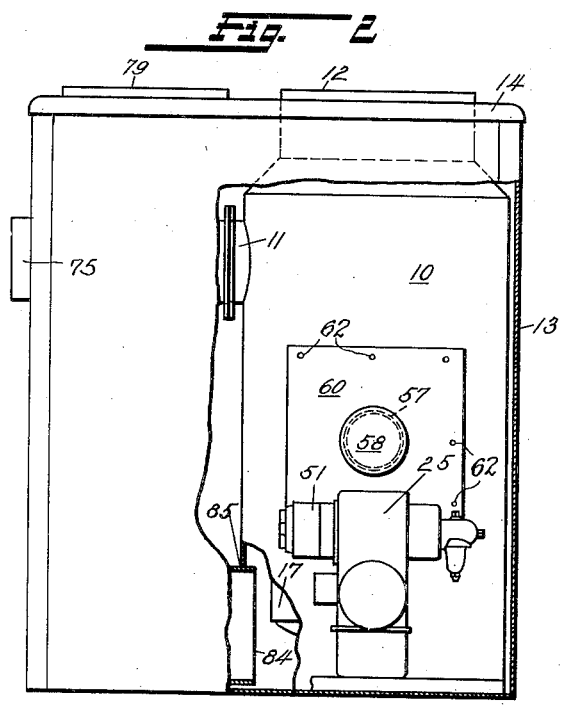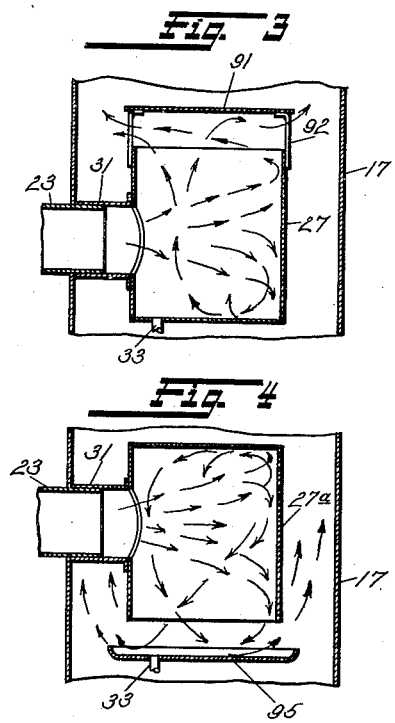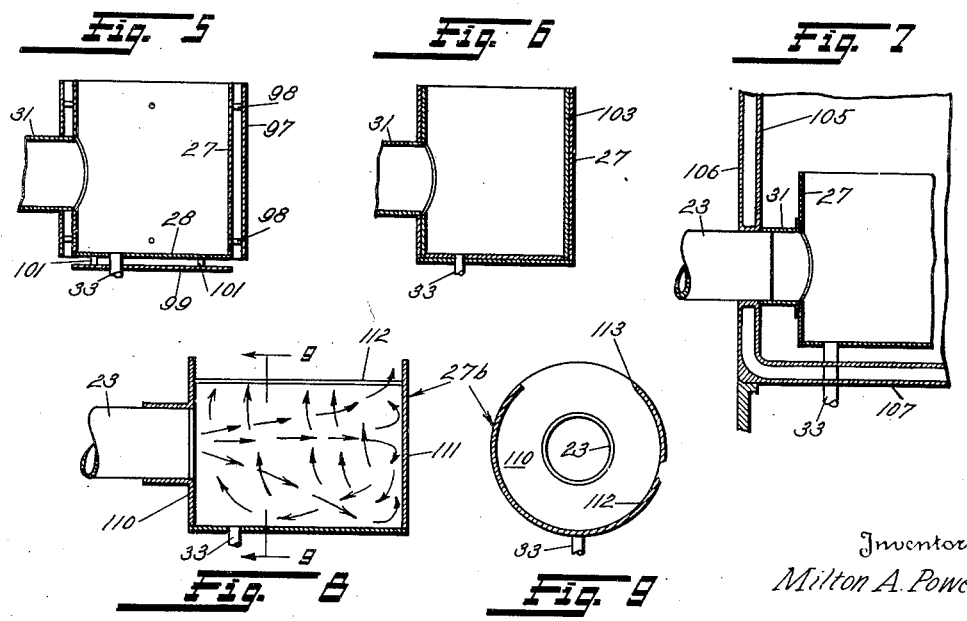

Patented Feb. 28, 1939

2,149,182

UNITED STATES PATENT OFFICE 2,149,182

LIQUID FUEL BURNING APPARATUS

Milton A. Powers, Detroit, Mich., assignor to The Timken-Detroit Axle Company, Detroit, Mich., a corporation of Ohio Application April 1, 1936, Serial No. 72,214
Renewed November 23, 1938

10 Claims. (Cl. 158—4)

The present invention relates to apparatus for burning liquid fuel and it is more particularly concerned with oil burners of the so-called gun burner type which mechanically atomize the oil in a nozzle and it aims to increase the combustion efficiency of such burners.

Heretofore, gun burners have fired directly into a chamber provided in the furnace and which was thickly lined with a ceramic refractory material. Although this form of combustion chamber is open to many objections, it is still in wide use today because of the lack of a better combustion chamber assembly. The disadvantages of the ceramic combustion chamber may be summarized as follows:

(1) By reason of the large heat capacity of the ceramic material the combustion chamber heats up slowly when the burner is initially started with the result that the heating unit, whether it be of the hot air, hot vapor or steam type, lags, and also some considerable condensation of oil may occur on the cool walls of the combustion chamber.

Also, when the burner is shut down, the large quantity of heat stored in the ceramic material continues to be conducted into the heating system and causes the temperature to rise above the predetermined "shut off" temperature.

(2) Because of the large volume and the low heat conductivity of the ceramic material the heating system is slow to warm up and even after it has attained operating temperatures the efficiency of heat transfer is low and no opportunity is present for heat transfer to occur by radiation.

(3) The rate of heat transfer in any system is greatest where the temperature is greatest, but in the ceramic and similar combustion chambers the zone of highest temperatures is surrounded by a thick layer of ceramic material, which materially retards heat transfer.

(4) The ceramic combustion chambers are inherently porous and are not fluid-tight, with the result that if the burner "floods" the walls thereof become saturated with oil. It takes some time for the oil deposit to burn off when the burner is again started and when it does so much soot is released, part of which deposits upon and impairs the efficiency of the heat transferring surfaces, while other parts are discharged up the stack and deposited in the neighborhood. The inability of the ceramic combustion chambers to be rendered fluid-tight makes it necessary to use expensive thermal responsive control mechanisms for shutting down the burner when combustion fails.

In prior gun burner installations much heat has been lost by reason of the so-called "pouch" or pocket that is formed in the region where the burner assembly enters the furnace and which does not serve to transfer heat to the heating medium.

The gun burner installations of today are largely "tailor made" jobs because the ceramic material or brickwork is built up by hand in the particular furnace involved, with the result that the job is not only costly, but also no uniformity of combustion chamber size or proportions is secured—these factors depending largely upon the judgment of the individual in charge of the work.

It is accordingly a primary object of this invention to provide a novel inexpensive gun burner combustion chamber assembly which is easily assembled, is rugged in construction and which promotes efficient combustion and efficiently transfers heat to the heated medium.

Another important object is to provide liquid fuel burning apparatus which will thoroughly combust the fuel and which will efficiently transmit heat by direct radiation from the hottest part of the combustion zone to the medium to be heated.

A further object is to provide a gun burner combustion chamber assembly which will heat up rapidly when the burner is started, will promptly initiate heat transmission to the heated medium and which will cool off rapidly when the burner is shut down.

My invention also aims to provide a combustion chamber assembly for a gun burner which is made of comparatively thin heat-resistant metal, which thoroughly mixes the air and oil vapors to promote efficient combustion and hold the hottest zone down in the lower part of the furnace, and which radiates heat directly through an unobstructed air space to the medium to be heated.

Another object is to devise combustion chamber assemblies for gun burners which may be made in standard sizes and quickly installed in new furnaces at the factory or in conversion units.

Further objects of the invention will become apparent as the specification proceeds in connection with the annexed drawings, and from the appended claims.

In the drawings:

Figure 1 is a vertical sectional view of a hot air furnace embodying my invention, and it is taken through the combustion chamber part of the heating plant.

Figure 2 is a front view of the apparatus illustrated in Figure 1 with a portion of the outer casing and the inner partition broken away, and also with other parts broken away and in section to more clearly illustrate the construction involved.

Figure 3 is a fragmental sectional view taken along a section line similar to Figure 1, but illustrates a modified form of combustion chamber forming part of the invention.

Figure 4 is a view similar to Figure 3, but illustrates a further modified form of combustion chamber of inverted type, also forming part of my invention.

Figure 5 is a view similar to Figures 3 and 4, but illustrates the combustion chamber equipped with a radiation shield for increasing the operating temperature thereof.

Figure 6 is similar to Figure 5, but illustrates a further form of the invention and shows a refractory lining for increasing the operating temperature of the combustion chamber.

Figure 7 shows the combustion chamber of my invention mounted in a hot water or steam heating boiler having a water leg under the combustion chamber.

Figure 8 is a fragmental sectional view illustrating a still further modified form of combustion chamber also forming part of my invention, and Figure 9 is a sectional view taken on the line 9—9 of Figure 8, looking in the direction of the arrows.

With continued reference to the drawings, wherein like reference characters have been employed to designate like parts throughout the several views thereof, I have chosen to illustrate my fuel burning apparatus in connection with a hot-air type of furnace, but it is to be distinctly understood that it is not limited to such use. With particular reference to Figures 1 and 2, the furnace comprises a vertical cylindrical shell 10 having a flue gas outlet connection 11, a hot air exhaust 12 and it is mounted in a cabinet 13 which serves to give the unit a clean appearance and also serves the further purpose of an air manifold, to be hereinafter pointed out.

Mounted within shell 10, upon a plurality of spaced legs 16, and located preferably centrally within the shell, is a second shell 17 which defines the combustion gas compartment proper and which will hereinafter be termed the furnace for convenience. Shell 17 is tightly closed at the top and bottom by heads 18 and 19, which are secured thereto in any suitable manner, for instance, as by welding or the like. Rigidly secured in openings 21 and 22 in shells 10 and 17 respectively is a cylindrical sleeve 23, through which a discharge tube 24 of an oil burner 25 is adapted to project, as seen in Figure 1. The oil burner per se has not been illustrated in detail as it may be any desired oil burner of the mechanical atomization type.

Mounted within shell 17 are a plurality of bracket-like legs 26 which are secured to head 19. A generally cylindrical combustion chamber 27 having a closed bottom 28 and an open top rests upon brackets 26 and may be secured to the latter by means of cotter pins 29 or the like. Rigidly secured to chamber 27, and aligned with an opening 30 therein, is a sleeve-like member 31, which preferably loosely telescopes over sleeve 23. Cotter pins 29 preferably cooperate with lugs located exteriorly of chamber 27, so that the latter may be liquid-tight.

Chamber 27 is provided with an oil overflow drain opening 32 which communicates with a pipe 33 which passes through suitable openings in head 19, shell 10 and a partition member 34, which divides the large cabinet 13 into a front compartment and a rear compartment. Conduit 33 is provided with a chamber portion 36 having a partition 37. An outlet nozzle 38 carries any oil draining from the apparatus to a bucket 39 supported by an arm 40 on an automatic cut-off mechanism 41. The parts are so designed that when the burner fails to ignite oil will collect and drain into fuel bucket 39 and break the circuits for the various motors employed in the mechanism and thereby shut down burner operation should ignition fail or combustion be arrested. Mechanism 41 may assume any desired form and therefore it has not been illustrated in detail; however, in Figure 1 there is diagrammatically shown one form that mechanism 41 may take. Connected to lever 40 is an arm 45 carrying a contact 46 which cooperates with a stationary contact 47. A spring 48 normally urges the contacts into engagement. As seen in Figure 1, contact arm 45 and contact 47 are placed in series with the circuit for the oil burner motor 51, so that when bucket 39 fills with oil and pushes the contacts apart against the action of spring 48, the circuit to the motor is broken. Air is prevented from leaking into the combustion chamber by partition 37 provided in chamber 36 which forms a liquid seal against air ingress.

By reason of the fact that chamber 27 is all metal, it is fluid-tight, will not absorb oil and hence no expensive thermo-responsive devices are required to shut off the burner in case of failure.

When the burner is started a mixture of ignited fuel oil and air is projected substantially horizontally into combustion chamber 27 through opening 30. By reason of the shape of the combustion chamber, the flame is compelled to assume a turbulent character, which insures thorough mixing of the fuel and air, with the result that highly efficient combustion takes place within the combustion chamber.

In view of the fact that combustion gases are maintained within the combustion chamber for an appreciable length of time, they are not immediately exhausted up the stack. This results in an increase in heating efficiency. The walls of cumbustion chamber 27 are accordingly heated to a high temperature, and as the rate at which heat radiation takes place is proportional to the fourth power of the temperature difference, it is apparent that heat will radiate comparatively rapidly from the walls of the combustion chamber to cylindrical wall 17 of the furnace and also from the bottom wall 28 of the combustion chamber downwardly to head 19. After the combustion chamber gases pass out of the open top of the combustion chamber, they pass upwardly along the inner surface of the shell 17 and are finally exhausted through flue gas outlet 11.

I have provided a combustion chamber assembly that by reason of the thin heat resistant metal employed, will heat up rapidly when the burner is started, which will efficiently radiate heat to the heat absorbing surfaces 17 and 19 when the burner is operating and which will cool down rapidly when the burner has been shut off.

Any metal capable of withstanding the temperatures involved may be used for the combustion chamber, but I preferably employ No. 20 U. S. gauge 18% chrome steel. However, if the service is not severe, for instance, if the chamber is lined with an insulating material, a steel having a chrome content of from 4% to 6% may be used.

Access to the burner for installation and servicing, and also for inspection of the flame when the burner is in operation, is gained by means of the door assembly that will now be described.

With reference to Figure 1, a plate 55 is secured to shell 17 by means of nut and bolt assemblies 56, and welded thereto is a sleeve-like member 57. Hinged to member 57 in any suitable manner is a door 58 which may be opened to view the combustion conditions. Member 57 extends through a plate 59 and a plate 60 secured to shell 10 and partition 34 by means of screws 61 and 62, respectively.

In view of the fact that plates 60, 59 and 55 are of decreasing size it is apparent that they may be removed in succession to expose a large opening 63 through which the combustion chamber may be installed and serviced. It also may be particularly observed that substantially the entire outer surface of shell 17 constitutes a heating surface and it is only obstructed by the comparatively small sleeve 57 and the sleeve 23 through which the burner nose projects. There is accordingly no suggestion of the usual "pouch" with which heating plants have been heretofore provided.

In order to prevent the flue gases from being exhausted directly up the stack I have provided a baffle member 64 which extends approximately half-way across the shell 17 as seen in Figure 1.

In order to properly humidify the warm air exhausted from outlet opening 12, I have provided a humidifier 65 which may assume any desired form. Preferably it is secured to shell 17 by means of bolt and nut assemblies 66, and is provided with an opening 67 through which the water vapors may escape into the heated air chamber. Mounted on the front face of partition 34 is a receptacle 68 which communicates with humidifier 65 by means of a pipe connection 69. A constant water level is maintained in receptacle 68 by any suitable form of automatic mechanism (not shown) which thereby maintains a constant level of water in humidifier 65.

Although I have shown and prefer to use shells 19, 17 and 27 which are circular in horizontal section, it is to be understood that they may be of oval or rectangular section without departing from the spirit of my invention.

After the flue gases leave the furnace by way of connection 11 they enter a radiator (not shown) and are ultimately exhausted through a stack connection 75.

Although convection currents ordinarily may be relied upon to circulate the air through the system, as it passes downwardly in the casing through connection 79 I preferably mount a centrifugal blower (not shown) in housing 13 and allow its discharge end 84 to project through an opening 85 in the lower part of shell 10. The circuit of the fan motor is preferably, though not necessarily simultaneously controlled with the circuit for the motor 51 of the oil burner 25, so that circulation of the air will be initiated simultaneously with initiation of operation of the burner.

Assuming that the burner is in operation, cool air returning from the room or rooms enters opening 79 and passes downwardly through the radiator and also around and over the external surfaces thereof, with the result that heat abstracted from the flue gases is transmitted to the incoming air. The preheated air then enters the blower and is discharged into the chamber surrounding the furnace 17 and it is observed (Figure 1) that the cool air is passed under head 19 of the furnace as well as around the walls 17 thereof, with the result that heat is uniformly abstracted from the furnace wall.

In Figure 3 of the drawings I have illustrated the combustion chamber assembly of Figures 1 and 2 equipped with a baffle 91 supported on the upper edge of combustion chamber 27 by a plurality of legs 92. In this form of the invention the combustion gases are maintained in combustion chamber 27 for a longer period of time and when they are exhausted therefrom they are deflected over into engagement with the inner wall of shell 17. If desired, deflector element 91 may be made larger so as to overhang combustion chamber 27 and thereby exert an augmented deflecting action upon the gases. Also as desired the outer periphery of deflector 91 may be turned upwardly at an inclination to produce any desired flue gas deflecting action.

In Figure 4, I have illustrated a further modification of the invention. Combustion chamber 27a is associated with shell 17 and the gun burner in a manner similar to that shown in Figure 1, but it is inverted, so that it has a closed top and an open bottom. Disposed under the combustion chamber is a shallow pan-like member 95 with which overflow pipe 33 is connected. When the burner is operating in this form of the invention the gases are thoroughly intermixed and combusted in combustion chamber 27a in a manner similar to the other modifications of the invention, but they are forced to flow downwardly adjacent pan 95 and then flow upwardly between the annular space defined by members 17 and 27a. In view of the fact that member 95 is directly opposite the hottest zone of combustion it is heated to a high temperature comparable to the temperature attained by the side walls of the combustion chamber 27a and it accordingly becomes a heat radiating element and radiates heat directly downwardly to head 19. The combustion chamber in this form of the invention is maintained at a higher temperature than the other forms wherein the combustion chamber is upright because the gases passing upwardly in contact with the outer walls of the combustion chamber result in heating the combustion chamber both externally and internally. If desired pan 95 may be omitted and head 19 relied upon to collect the oil overflow for conduit 33.

In Figures 5 and 6 I have illustrated the combustion chamber of Figure 1 as having means associated therewith for retarding the radiation of heat to shell 17, so as to raise the normal operating temperature of the combustion chamber. In the combustion chamber shown in Figure 5 this result is brought about by securing a cylindrical shell 97 to the exterior of combustion chamber 27 by a plurality of stud members 98. In order to retard heat radiation downwardly from the bottom wall 28 of the combustion chamber I have secured a disk-like plate 99 thereto by means of a plurality of studs 101. Shell 97 and disc 99 are preferably also constructed of a heat resistant comparatively thin sheet metal and as they are disposed in the line of radiation of heat from the combustion chamber to shell 17 they accordingly retard the rate at which heat is dissipated from the combustion chamber and raise the temperature of the latter.

In the device shown in Figure 6 the retardation of heat radiation is effected by lining combustion chamber 27 with a refractory material 103, which has the effect of retarding heat radiation in shell 17 in a manner similar to the device shown in Figure 5. Whether or not a heat retarding assembly will be used with the combustion chamber is determined by the desired operating characteristic of the particular installation involved.

In Figure 7 I have illustrated the combustion chamber assembly of Figure 1 as being associated with a hot water or steam boiler 105 having water-jacketed side walls 106 and a water-jacketed bottom wall 107. As regards combustion, this combustion chamber assembly functions in the same manner as that shown in Figure 1, and it is apparent that as the combustion chamber is surrounded at its sides and its bottom by water-backed surfaces, heat will be rapidly radiated thereto at high thermal efficiency.

In Figures 8 and 9, I have illustrated a somewhat modified form of combustion chamber 27b which is in the form of a horizontal cylinder having an open upper side. One end of the cylinder is provided with a head 110 into which sleeve 23 is fitted. The combustion chamber is provided with an imperforate end 111 and a cylindrical wall 112 whose ends are spaced apart as seen in Figure 9 to provide a large flue gas exit opening 113. This combustion chamber is mounted within shell 17 or within water-backed furnace 105 in a manner similar to the previous forms of combustion chambers. In operation the ignited mixture of oil and air is projected substantially horizontally into the chamber wherein it is thoroughly mixed and combusted and is finally exhausted through opening 113. If desired chamber 27b may be inverted so as to bring opening 113 downwardly and permit it to operate in a manner similar to the combustion chamber shown in Figure 4.

Although I have described the gun burner as projecting the ignited oil vapor and air mixture substantially horizontally into the various combustion chambers disclosed, it is to be understood that the gun burner may be inclined slightly upwardly or downwardly with respect to the horizontal, depending upon the desired operating characteristics without departing from the spirit of my invention. Moreover, the gun burner has been disclosed as entering the various combustion chambers in a substantially radial direction and I prefer to use this arrangement as it produces a maximum turbulence, but it is to be understood that the burner may be brought in at an angle lying between a tangent and a radius if it is desired to produce a swirling action in the combustion chamber, and the appended claims are intended to embrace my invention when it assumes this form. Also, I have shown the combustion chambers as being located approximately centrally with respect to the furnace but they may be mounted in offset relationship if the operating conditions of the particular installation involved require it.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a liquid fuel burning apparatus, a heat absorbing structure providing generally upright walls and defining a hollow combustion chamber, a hollow second combustion chamber disposed within said heat absorbing structure and having generally upright walls disposed wholly within and spaced from said upright walls of said heat absorbing structure, the space between said combustion chambers being substantially wholly unobstructed to provide for efficient heat transfer therebetween, said upright walls of said second combustion chamber being constructed of comparatively thin, heat-resistant light gauge sheet metal of relatively high heat conductivity, whereby the same may rapidly heat up and rapidly cool down in response to combustion conditions therein, said second combustion chamber having an opening in the upright wall thereof, and means for projecting an ignited mixture of atomized liquid fuel and air at high velocity through said opening into said second combustion chamber, said second combustion chamber having a lower end and an upper end, one of said ends being open, said opening in said upright wall being located between the ends of said second combustion chamber, whereby said mixture of atomized liquid fuel and air is directed against one of said upright walls of said second combustion chamber, said second combustion chamber being of sufficiently small volumetric capacity to cause said ignited mixture to impinge and spread out over substantially the entire area of the inner surface of said second combustion chamber and heat said second combustion chamber to a high temperature and cause the latter to radiate heat directly to the walls of said heat absorbing structure.

2. In a liquid fuel burning apparatus, a heat absorbing structure providing generally upright walls and defining a hollow combustion chamber, a hollow second combustion chamber disposed wholly within said heat absorbing structure and being spaced therefrom, the space between the walls of said combustion chambers being substantially wholly unobstructed to provide for efficient heat transfer therebetween, said second combustion chamber being constructed of comparatively thin, heat-resistant light gauge sheet metal of relatively high heat conductivity, whereby the same may rapidly heat up and rapidly cool down in response to combustion conditions therein, said second combustion chamber having an opening in a side wall thereof, and means for projecting an ignited mixture of atomized liquid fuel and air at high velocity through said opening into said second combustion chamber, said second combustion chamber being spaced from the bottom of said heat absorbing structure and having a bottom and an open top, said opening being located between the top and bottom of said second combustion chamber, said second combustion chamber being of sufficiently small volumetric capacity to cause said ignited mixture to impinge upon the wall thereof opposite said opening and spread out over substantially the entire area of the wall thereof and said bottom and heat said second combustion chamber to a high temperature, for causing the latter to rapidly radiate heat directly to the walls of said heat absorbing structure.

3. The liquid fuel burning apparatus set forth in claim 2, wherein said walls of said combustion chambers are of curved configuration and are disposed in substantially uniformly spaced relation to each other.

4. The liquid fuel burning apparatus set forth in claim 2, wherein a deflecting device surmounts the open upper end of said second combustion chamber for causing the products of combustion issuing from the latter to fan out into contact with the inner surface of said heat absorbing structure.

5. In a liquid fuel burning apparatus, a heat absorbing structure providing generally upright walls and defining a hollow combustion chamber, a hollow second combustion chamber disposed within said heat absorbing structure and having generally upright walls disposed wholly within and spaced from said upright walls of said heat absorbing structure, said upright walls of said second combustion chamber being constructed of comparatively thin, heat-resistant light gauge sheet metal of relatively high heat conductivity, whereby the same may rapidly heat up and rapidly cool down in response to combustion conditions therein, said second combustion chamber having an opening in the upright wall thereof, and means for projecting an ignited mixture of atomized liquid fuel and air at high velocity through said opening into said second combustion chamber, said wall of said heat absorbing structure having an opening aligning with the opening of said second combustion chamber and a member bridging the space between the walls of said combustion chambers and placing said openings in fluid communication, said second combustion chamber having a closed end and an open end and said opening being located between the ends of said second combustion chamber, said second combustion chamber being of sufficiently small volumetric capacity to cause said ignited mixture to impinge and spread out over substantially the entire area of the inner surface and the closed end of said second combustion chamber and heat said second combustion chamber to a high temperature and cause the latter to radiate directly to the walls of said heat absorbing structure.

6. In a liquid fuel burning apparatus, a heat absorbing structure providing generally upright walls and defining a hollow combustion chamber, a hollow second combustion chamber disposed within said heat absorbing structure and having generally upright walls disposed wholly within and spaced from said upright walls of said heat absorbing structure, said upright walls of said second combustion chamber being constructed of comparatively thin, heat-resistant light gauge sheet metal of relatively high heat conductivity, whereby the same may rapidly heat up and rapidly cool down in response to combustion conditions therein, said second combustion chamber having an opening in the upright wall thereof, and means for projecting an ignited mixture of atomized liquid fuel and air at high velocity through said opening into said second combustion chamber, said second combustion chamber having a closed end and an open end and said opening being located between the ends of said second combustion chamber, said second combustion chamber being of sufficiently small volumetric capacity to cause said ignited mixture to impinge and spread out over substantially the entire area of the inner surface and the closed end of said second combustion chamber and heat said second combustion chamber to a high temperature and cause the latter to radiate heat directly to the walls of said heat absorbing structure, said second combustion chamber being disposed within said heat absorbing structure with its open end facing downwardly, for causing the products of combustion issuing from said second combustion chamber to circulate downwardly and then upwardly in the space between said heat absorbing structure and said second combustion chamber.

7. In a liquid fuel burning apparatus, a heat absorbing structure providing generally upright walls and defining a hollow combustion chamber, a hollow second combustion chamber disposed within said heat absorbing structure and having generally upright walls disposed wholly within and spaced from said upright walls of said heat aborbing structure, said upright walls of said second combustion chamber being constructed of comparatively thin, heat-resistant light gauge sheet metal of relatively high heat conductivity, whereby the same may rapidly heat up and rapidly cool down in response to combustion conditions therein, said second combustion chamber having an opening in the upright wall thereof, and means for projecting an ignited mixture of atomized liquid fuel and air at high velocity through said opening into said second combustion chamber, said second combustion chamber being spaced from the bottom of said heat absorbing structure and having a closed bottom and an open top, said opening being located between the top and bottom of said second combustion chamber, said second combustion chamber being of sufficiently small volumetric capacity to cause said ignited mixture to impinge upon the wall thereof opposite said opening and spread out over substantially the entire area of the wall thereof and said closed bottom and heat said second combustion chamber to a high temperature, for causing the latter to rapidly radiate heat directly to the walls of said heat absorbing structure, said second combustion chamber being liquid-tight and having a pipe communicating with the bottom thereof for carrying away any excess liquid fuel accumulating therein to a circuit-breaking mechanism or the like.

8. In a liquid fuel burning apparatus, a heat absorbing structure providing generally upright walls and defining a hollow combustion chamber, a hollow second combustion chamber disposed within said heat absorbing structure and having generally upright walls disposed wholly within and spaced from said upright walls of said heat absorbing structure, said upright walls of said second combustion chamber being constructed of comparatively thin, heat-resistant light gauge sheet metal of relatively high heat conductivity, whereby the same may rapidly heat up and rapidly cool down in response to combustion conditions therein, said second combustion chamber having an opening in the upright wall thereof, and means for projecting an ignited mixture of atomized liquid fuel and air at high velocity through said opening into said second combustion chamber, said second combustion chamber being spaced from the bottom of said heat absorbing structure and having an open bottom and a closed top, said opening being located between the top and bottom of said second combustion chamber, said second combustion chamber being of sufficiently small volumetric capacity to cause said ignited mixture to impinge upon the wall thereof opposite said opening and spread out over substantially the entire area of the wall thereof and said closed top and heat said second combustion chamber to a high temperature, for causing the latter to rapidly radiate heat directly to the walls of said heat absorbing structure, and a reservoir-forming member disposed beneath, and spaced from the open bottom of said second combustion chamber for receiving any liquid fuel draining therefrom, and a conduit communicating with said member for conveying any liquid fuel that may accumulate therein away from said combustion chamber to a circuit-breaker or the like.

9. In a liquid fuel burning apparatus, a heat absorbing structure providing generally upright walls and a bottom wall and defining a hollow combustion chamber, a hollow second combustion chamber disposed within said heat absorbing structure and having generally upright walls disposed wholly within and spaced from said upright walls of said heat absorbing structure, said upright walls of said second combustion chamber being constructed of comparatively thin, heat-resistant light gauge sheet metal of relatively high heat conductivity, whereby the same may rapidly heat up and rapidly cool down in response to combustion conditions therein, said second combustion chamber having an opening in the upright wall thereof, and means for projecting an ignited mixture of atomized liquid fuel and air at high velocity through said opening into said second combustion chamber, said second combustion chamber being spaced from the bottom of said heat absorbing structure and having a closed bottom and an open top, said opening being located between the top and bottom of said second combustion chamber, said second combustion chamber being of sufficiently small volumetric capacity to cause said ignited mixture to impinge upon the wall thereof opposite said opening and spread out over substantially the entire area of the wall thereof and said closed bottom and heat said second combustion chamber to a high temperature, for causing the latter to rapidly radiate heat directly to the upright and bottom walls of said heat absorbing structure.

10. In a liquid fuel burning apparatus, a heat absorbing structure defining a hollow combustion chamber, a hollow second combustion chamber disposed wholly within said heat absorbing structure and spaced from the walls thereof, the space between the walls of said combustion chambers being substantially unobstructed to provide for efficient heat transfer therebetween, the walls of said second combustion chamber being constructed of comparatively thin, heat-resistant light gauge sheet metal of relatively high heat conductivity, whereby the same may rapidly heat up and rapidly cool down in response to combustion conditions therein, said second combustion chamber having an opening provided therein, means for projecting an ignited mixture of atomized liquid fuel and air at high velocity through said opening into said second combustion chamber, said second combustion chamber being of sufficiently small volumetric capacity to cause said ignited mixture and products of combustion to spread out over substantially the entire area of the walls thereof and heat said second combustion chamber to a high temperature, for causing the latter to rapidly radiate heat directly to the walls of said heat absorbing structure, said second combustion chamber also having an exhaust opening provided therein, through which the products of combustion may escape into said first named combustion chamber, said second combustion chamber having a wall located opposite said first-named opening, adapted to be impinged by said ignited mixture of atomized liquid fuel and air, and operable to prevent the escape of said mixture directly to said exhaust opening.

MILTON A. POWERS.